United States Patent
Liu et al.

(10) Patent No.: US 9,894,542 B2
(45) Date of Patent: Feb. 13, 2018

(54) METHOD, SYSTEM AND DEVICE FOR DELIVERING MINIMIZATION OF DRIVE-TESTS MEASUREMENT CONFIGURATION PARAMETERS

(75) Inventors: Aijuan Liu, Beijing (CN); Yan Wang, Beijing (CN); Yi Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 212 days.

(21) Appl. No.: 14/114,574

(22) PCT Filed: Mar. 29, 2012

(86) PCT No.: PCT/CN2012/073230
§ 371 (c)(1),
(2), (4) Date: Oct. 29, 2013

(87) PCT Pub. No.: WO2012/146115
PCT Pub. Date: Nov. 1, 2012

(65) Prior Publication Data
US 2014/0064132 A1    Mar. 6, 2014

(30) Foreign Application Priority Data
Apr. 29, 2011   (CN) .......................... 2011 1 0112563

(51) Int. Cl.
*H04W 24/08* (2009.01)
*H04W 24/10* (2009.01)
*H04W 36/08* (2009.01)

(52) U.S. Cl.
CPC .......... *H04W 24/08* (2013.01); *H04W 24/10* (2013.01); *H04W 36/08* (2013.01)

(58) Field of Classification Search
None
See application file for complete search history.

(56) References Cited

U.S. PATENT DOCUMENTS

2010/0330921 A1*   12/2010   Kim ...................... H04W 24/10
                                                              455/67.11
2011/0250880 A1*   10/2011   Olsson ......................... 455/423
(Continued)

FOREIGN PATENT DOCUMENTS

CN    101931981 A    12/2010
CN    101998463 A     3/2011
(Continued)

OTHER PUBLICATIONS

International Search Report for PCT/CN2012/073230, dated May 31, 2012, 6 pages.
(Continued)

*Primary Examiner* — Jeffrey M Rutkowski
*Assistant Examiner* — Ning Li
(74) *Attorney, Agent, or Firm* — Kilpatrick Townsend & Stockton LLP

(57) ABSTRACT

Embodiments of the present application discloses a method, system and apparatus for transmitting Minimization of Drive-Tests (MDT) measurement configuration parameters, relate to the field of wireless communications and address the problem that a User Equipment (UE) can not perform MDT measurement when the UE is configured by the network side to perform MDT measurement. In the present application, a Mobility Management Entity (MME) receives MDT measurement configuration parameters of a user equipment transmitted from a Home Subscriber Server (HSS); the MME determines whether cell list information in the MDT measurement configuration parameters includes information of a cell controlled by a base station controlling a serving cell of the user equipment; and the MME transmits the MDT measurement configuration parameters to the base station serving the user equipment when the result of deter-
(Continued)

mination is YES. With the invention, the problem of the UE failing to perform MDT measurement can be avoided.

6 Claims, 9 Drawing Sheets

(56) References Cited

U.S. PATENT DOCUMENTS

| | | | |
|---|---|---|---|
| 2011/0287793 A1* | 11/2011 | Tenny et al. | 455/507 |
| 2012/0082051 A1* | 4/2012 | Kim | H04W 24/10 370/252 |
| 2012/0135732 A1* | 5/2012 | Magadi Rangaiah | H04W 48/20 455/434 |
| 2012/0300657 A1* | 11/2012 | Jung | H04W 24/10 370/252 |
| 2012/0309431 A1* | 12/2012 | Bodog | 455/456.6 |
| 2012/0315890 A1* | 12/2012 | Suzuki et al. | 455/422.1 |
| 2012/0322386 A1* | 12/2012 | Yi et al. | 455/67.11 |
| 2013/0064120 A1* | 3/2013 | Bodog et al. | 370/252 |
| 2014/0031041 A1* | 1/2014 | Jung | H04W 36/30 455/437 |

FOREIGN PATENT DOCUMENTS

| | | | |
|---|---|---|---|
| CN | 102202284 A | 9/2011 | |
| EP | 2704476 A1 | 3/2014 | |
| WO | WO 2011/121398 A1 * | 4/2010 | H04W 24/10 |
| WO | WO 2011/065718 A2 * | 11/2010 | H04W 48/04 |
| WO | WO 2012/110100 A1 * | 2/2011 | H04W 24/10 |

OTHER PUBLICATIONS

"3$^{rd}$ Generation Partnership Project, Technical Specification and System Aspects," 3GPP TS 32.422 V10.3, Mar. 2011, 111 pages.
NTT Docomo, Inc., 3GPP TSG-RAN WG2 #71, Aug. 23-27, 2010, Madrid, Spain, R2-104850, 4 pages.
Alcatel-Lucent, U3GPP TSG-SA5 (Telecom Management), Meeting SA5#73, Aug. 23-27, 2010, New Delhi, India, S5-102235, 9 pages.
3GPP, 3GPP TS 36.300 V10.3.0 (Mar. 2011) Technical Specification, 197 pages.
Written Opinion for PCT/CN2012/073230 dated May 31, 2012, 12 pages.
International Preliminary Report on Patentability for PCT/CN2012/073230 dated Oct. 29, 2013, 13 pages.

* cited by examiner

METHOD, SYSTEM AND DEVICE FOR DELIVERING MINIMIZATION OF DRIVE-TESTS MEASUREMENT CONFIGURATION PARAMETERS

This application is a US National Stage of International Application No. PCT/CN2012/073230, filed on Mar. 29, 2012, designating the United States and claiming the benefit of Chinese Patent Application No. 201110112563.6, filed with the Chinese Patent Office on Apr. 29, 2011 and entitled "Method, system and apparatus for transmitting minimization of drive-tests measurement configuration parameters", which is hereby incorporated by reference in its entirety.

FIELD OF THE INVENTION

The present invention relates to the field of wireless communications and particularly to a method, system and apparatus for transmitting minimization of drive-tests measurement configuration parameters.

BACKGROUND OF THE INVENTION

In a future mobile communication system, introduction of a network self-optimization mechanism is desirable for decreased manual participation in network planning, operation and maintenance and automatic optimization of parameters by a network from a statistic to thereby lower deployment and operation costs of the network. In order to lower operation and maintenance costs of the network, it is desirable to adopt a method for the network to configure a User Equipment (UE) for reporting to thereby lower an effort of manual drive-tests, which is referred to as a Minimization of Drive-Tests (MDT) scheme. On the other hand, it is also desirable to obtain through MDT radio measurement information of an area unreachable to normal drive-tests.

MDT is divided, depending on how to report an MDT result, into immediate MDT and logged MDT particularly as follows:

In immediate MDT, a user equipment performs MDT measurement and reporting in a connected status. A Radio Resource Management (RRM) measurement mechanism is reused to make a report to a base station/a Radio Network Controller (eNB/RNC) once a reporting condition is satisfied.

In logged MDT, a UE performs MDT measurement in an idle status and makes a report in a subsequent connected status. Once a configured trigger condition is satisfied, a measurement result will be obtained and logged and reported to an eNB/RNC on a subsequent appropriate occasion.

MDT measurement configuration can be categorized into cell-based MDT measurement configuration and UE-based MDT measurement configuration. FIG. 1 is a schematic diagram of transporting UE-based MDT measurement configuration parameters. A Mobility Management Entity (MME) can obtain UE-related MDT measurement configuration parameters (immediate MDT or logged MDT measurement configuration parameters) from a Home Subscriber Server (HSS). The MDT measurement configuration parameters include a measurement content, a report object and other information and also configuration policy information including a set of International Mobile Subscriber identities (IMSIs)/International Mobile Equipment Identities (IMEIs) and also possibly information on area scope of MDT measurement, Tracking Area (TA) or cell list information. The MME transmits the MDT measurement configuration parameters to a corresponding UE according to the configuration policy information.

At present a signaling flow of UE-based MDT measurement configuration is as illustrated in FIG. 2. In an Attach procedure of the UE, the HSS determines the UE to perform MDT measurement from a stored list of IMSIs/IMEIs for MDT measurement and transmits the MDT measurement configuration parameters to the MME to which the UE is attached, and subsequently if the MME determines that the UE resides in an area scope of MDT measurement according to the configuration policy information, then the MME has the MDT measurement configuration parameters carried in a initial context setup request message and transmits the message to the eNB, and if the eNB determines upon reception of the message that the message carries logged MDT measurement configuration parameters, then the eNB transmits the measurement configuration parameters to the UE in a piece of new Radio Resource Control (RRC) signaling; or if the eNB determines that the message carries immediate MDT measurement configuration parameters, then the eNB transmits the measurement configuration parameters to the UE in an RRC connection reconfiguration message.

The inventors have identified during making of the invention the following technical problems in the prior art:

For the immediate MDT configuration mechanism with the MDT measurement configuration parameters including the IMSIs/IMEIs and the cell list, in an initial access procedure of the UE, if a serving cell of the UE is absent in the cell list of the MDT measurement configuration parameters, then the MME will not transmit the MDT measurement configuration parameters to the current eNB. Thereafter the UE is subjected to an intra-eNB handover and a target cell after the handover is in the cell list, but the MME does not participate the intra-eNB handover, so the MME is unaware of the change to the serving cell of the UE and further will not know the entry of the UE into the MDT measurement cell range, meaning that the MME can not transmit the MDT measurement configuration parameters to the currently serving eNB of the UE so that the UE can not perform MDT measurement as necessary.

SUMMARY OF THE INVENTION

Embodiments of the invention provide a method, system and apparatus for transmitting MDT measurement configuration parameters so as to address the problem that a UE can not perform MDT measure when the UE is configured by the network side to perform MDT measurement.

A method of transmitting MDT measurement configuration parameters includes:

an MME receiving MDT measurement configuration parameters of a user equipment transmitted from an HSS;

the MME determining whether cell list information in the MDT measurement configuration parameters includes information of a cell controlled by a base station controlling a serving cell of the user equipment; and the MME transmitting the MDT measurement configuration parameters to the base station serving the user equipment when the result of determination is YES.

A method of transmitting MDT measurement configuration parameters includes:

an MME receiving MDT measurement configuration parameters of a user equipment accessing a network transmitted from an HSS;

the MME obtaining information of a serving cell of the user equipment from a base station serving the user equipment, and determining whether cell list information in the MDT measurement configuration parameters includes the information of the serving cell; and the MME transmitting the MDT measurement configuration parameters to the base station serving the user equipment when the result of determination is YES.

An MME includes:

a receiving unit configured to receive MDT measurement configuration parameters of a user equipment transmitted from an HSS;

a determining unit configured to determine whether cell list information in the MDT measurement configuration parameters includes information of a cell controlled by a base station controlling a serving cell of the user equipment; and a transmitting unit configured to transmit the MDT measurement configuration parameters to the base station serving the user equipment when the result of determination is YES.

An MME includes:

a receiving unit configured to receive MDT measurement configuration parameters of a user equipment accessing a network transmitted from an HSS;

a determining unit configured to obtain information of a serving cell of the user equipment from a base station serving the user equipment, and to determine whether cell list information in the MDT measurement configuration parameters includes the information of the serving cell; and a transmitting unit configured to transmit the MDT measurement configuration parameters to the base station serving the user equipment when the result of determination is YES.

A base station includes:

a receiving unit configured to receive MDT measurement configuration parameters of a user equipment transmitted from a Mobility Management Entity (MME);

a determining unit configured to determine whether the user equipment is handed over to a cell in cell list information in the MDT measurement configuration parameters; and a transmitting unit configured to transmit the MDT measurement configuration parameters to the user equipment when the result of determination is YES.

A wireless communication system includes:

an MME configured to receive MDT measurement configuration parameters of a user equipment transmitted from a Home Subscriber Server (HSS), to determine whether cell list information in the MDT measurement configuration parameters includes information of a cell controlled by a base station controlling a serving cell of the user equipment, and to transmit the MDT measurement configuration parameters to the base station serving the user equipment when the result of determination is YES; and the base station configured to receive the MDT measurement configuration parameters of the user equipment transmitted from the MME, to determine whether the user equipment is handed over to a cell in the cell list information in the MDT measurement configuration parameters, and to transmit the MDT measurement configuration parameters to the user equipment when the result of determination is YES.

A wireless communication system includes:

an MME configured to receive MDT measurement configuration parameters of a user equipment accessing a network transmitted from an HSS, to obtain information of a serving cell of the user equipment from a base station serving the user equipment, to determine whether cell list information in the MDT measurement configuration parameters includes the information of the serving cell, and to transmit the MDT measurement configuration parameters to the base station serving the user equipment when the result of determination is YES; and the base station configured to receive the MDT measurement configuration parameters of the user equipment transmitted from the MME, and to transmit the MDT measurement configuration parameters to the user equipment.

In a solution according to an embodiment of the invention, an MME receives MDT measurement configuration parameters of a user equipment transmitted from an HSS, determines whether cell list information in the MDT measurement configuration parameters includes information of a cell controlled by a base station controlling a serving cell of the user equipment, and transmits the MDT measurement configuration parameters to the base station serving the user equipment when the result of determination is YES. As can be apparent, in this solution, the MME transmits the MDT measurement configuration parameters to the base station serving the user equipment when the cell list information in the MDT measurement configuration parameters includes information of a cell controlled by the base station controlling the serving cell of the user equipment, so that the base station can transmit the MDT measurement configuration parameters to the user equipment when the user equipment enters a cell in the cell list, and further the user equipment can perform MDT measurement according to the MDT measurement configuration parameters, thus avoiding the problem that the user equipment can not perform MDT measurement due to lack of the MDT measurement configuration parameters when the user equipment initially accesses a cell absent in the cell list but subsequently is handed over to a cell in the cell list.

In another solution according to an embodiment of the invention, an MME receives MDT measurement configuration parameters of a user equipment from an HSS, determines whether cell list information in the MDT measurement configuration parameters includes information of a cell controlled by a target base station of a handover upon reception of a handover request from a base station serving the user equipment, and transmits the MDT measurement configuration parameters to the target base station when the result of determination is YES. As can be apparent, in this solution, the MME transmits the MDT measurement configuration parameters to the target base station when the cell list information in the MDT measurement configuration parameters includes information of a cell controlled by the target base station to which the user equipment is handed over, so that the target base station can transmit the MDT measurement configuration parameters to the user equipment when the user equipment enters a cell in the cell list, and further the user equipment can perform MDT measurement according to the MDT measurement configuration parameters, thus avoiding the problem that the user equipment can not perform MDT measurement due to lack of the MDT measurement configuration parameters when the user equipment initially accesses a cell absent in the cell list but subsequently is handed over to a cell controlled by the target base station in the cell list.

In still another solution according to an embodiment of the invention, an MME receives MDT measurement configuration parameters of a user equipment accessing a network transmitted from an HSS, obtains information of a serving cell of the user equipment from a base station serving the user equipment, determines whether cell list information in the MDT measurement configuration parameters includes the information of the serving cell, and transmits the MDT measurement configuration parameters to the base station serving the user equipment when the result of determination is YES. As can be apparent, in this solution, the MME transmits the MDT measurement configuration parameters to the base station serving the user equipment when the cell list information in the MDT measurement configuration parameters includes the information of the serving cell of the user equipment accessing the network, so that the base station can transmit the MDT measurement configuration parameters to the user equipment, and further the user equipment can perform MDT measurement according to the MDT measurement configuration parameters, thus avoiding the problem that the user equipment can not perform MDT measurement due to lack of the MDT measurement configuration parameters when the user equipment initially accesses a cell absent in the cell list.

DETAILED DESCRIPTION OF THE EMBODIMENTS

In order to address the problem that a UE can not perform MDT measurement when the UE is configured by the network side to perform MDT measurement, embodiments of the invention provide a method of transmitting MDT measurement configuration parameters, and in this method, an MME transmits MDT measurement configuration parameters to a base station serving a user equipment when cell list information in the MDT measurement configuration parameters includes information of a cell controlled by the base station serving the user equipment.

Figure 1:
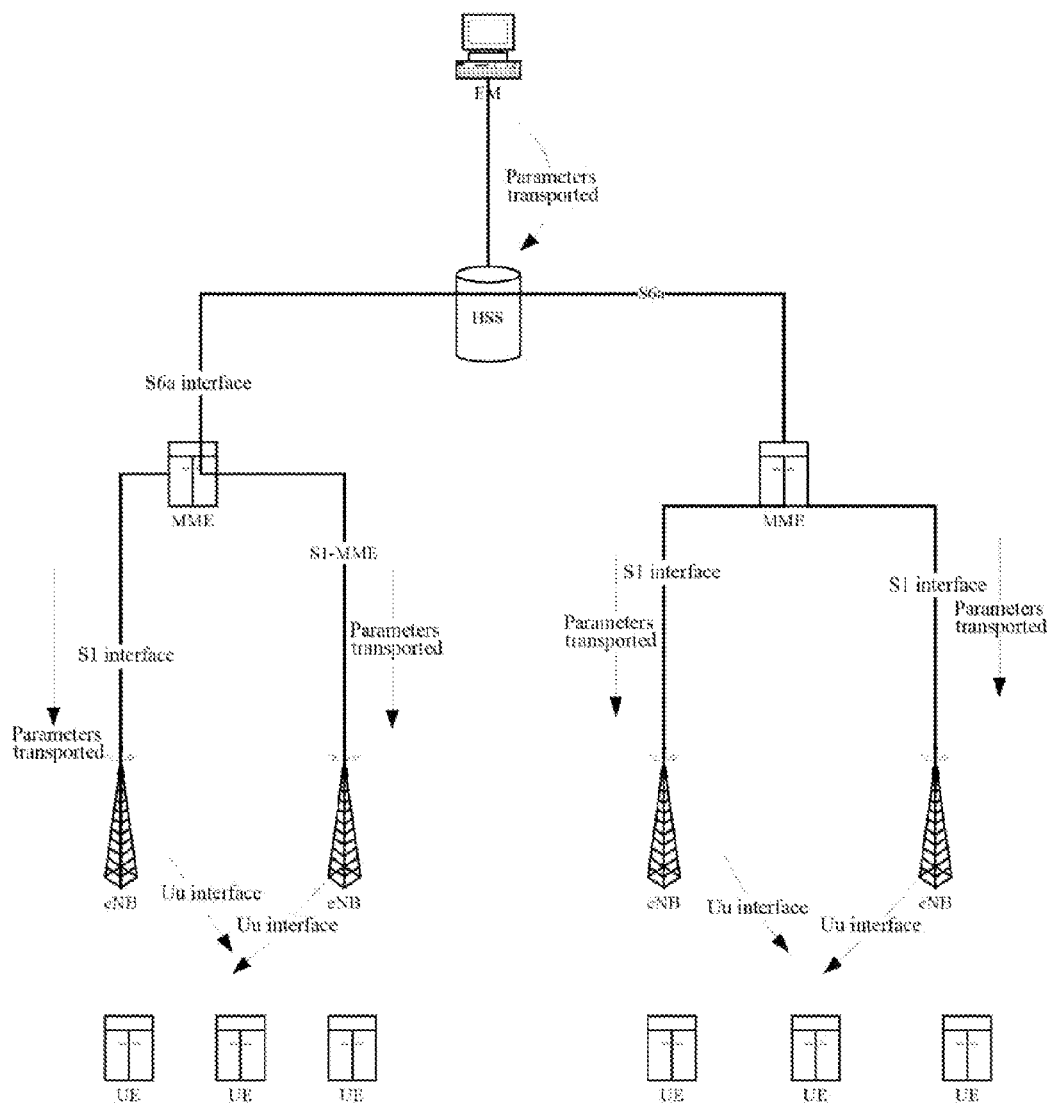
FIG. 1 is a schematic diagram of MDT configuration in the prior art.
Figure 2:
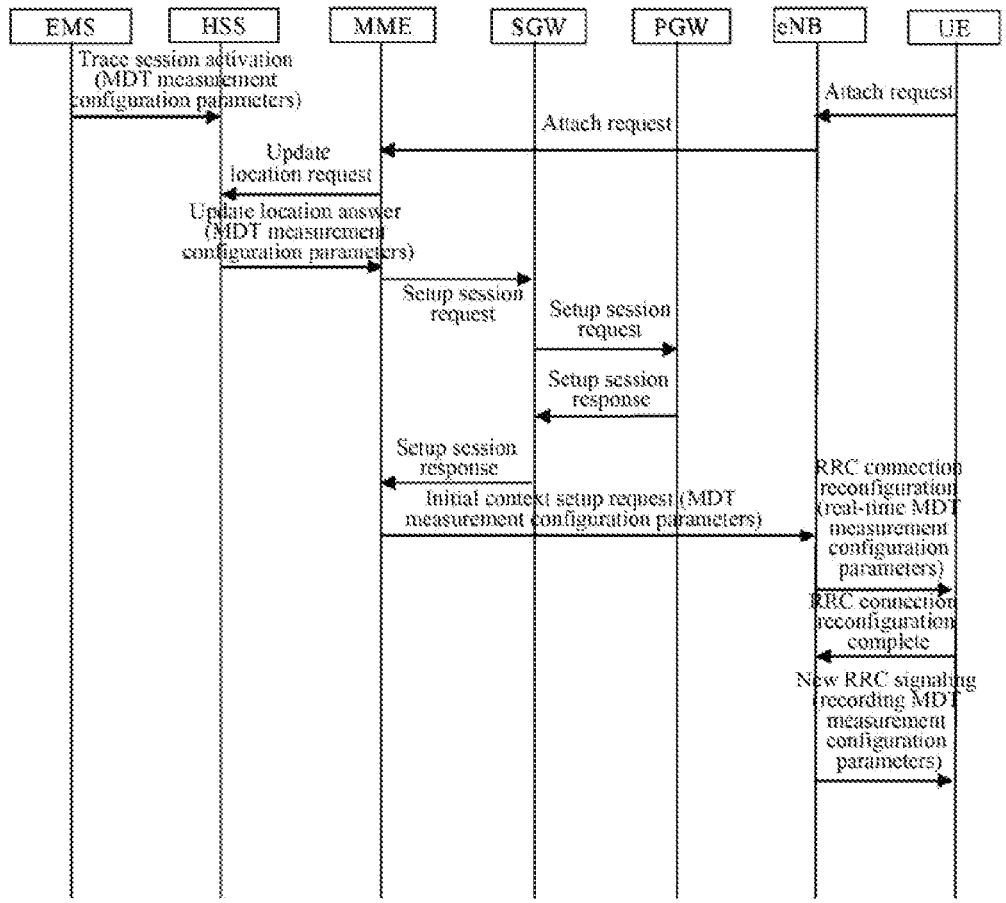
FIG. 2 is a schematic signaling flow chart of MDT configuration in the prior art.
Figure 3:
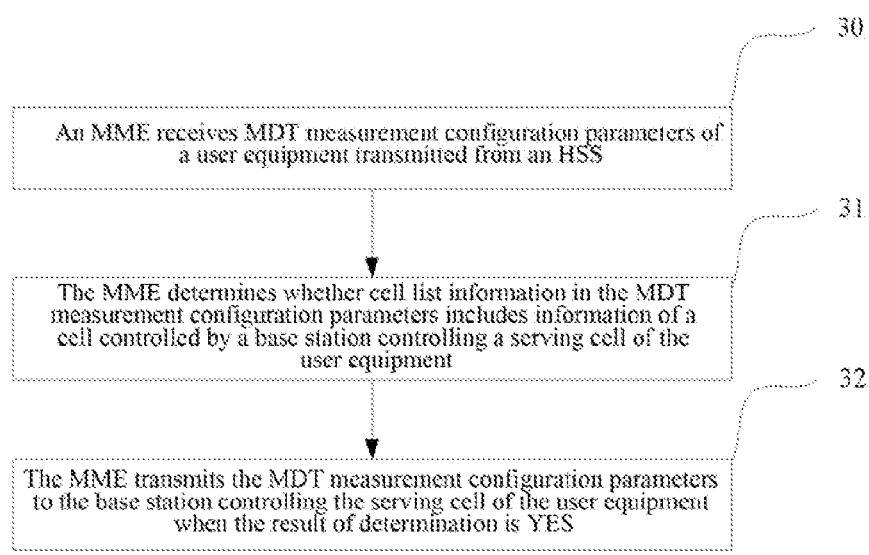
FIG. 3 is a schematic flow chart of a method according to an embodiment of the invention.

Referring to FIG. 3, a method of transmitting MDT measurement configuration parameters according to an embodiment of the invention includes the following steps:

Step 30: An MME receives MDT measurement configuration parameters of a user equipment transmitted from an HSS;

Step 31: The MME judges whether cell list information in the MDT measurement configuration parameters includes information of a cell controlled by a base station controlling a serving cell of the user equipment; and Step 32: The MME transmits the MDT measurement configuration parameters to the base station controlling the serving cell of the user equipment upon determining that the cell list information includes information of a cell controlled by the base station controlling the serving cell of the user equipment.

In an embodiment, before the MME receives the MDT measurement configuration parameters of the user equipment transmitted from the HSS in the step 30, the MME receives an initial user equipment message transmitted from the base station serving the user equipment, where the initial user equipment message is a message transmitted from the base station after establishing an RRC connection with the user equipment in an idle status; and the MME transmits an update location request message to the HSS to request the HSS for updating the location of the user equipment in a network; and Correspondingly the MME receives the MDT measurement configuration parameters of the user equipment transmitted from the HSS in the step 30 particularly as follows:

The MME receives an update location answer message returned from the HSS, where the update location answer message carries the MDT measurement configuration parameters of the user equipment.

In another embodiment, the MME receives the MDT measurement configuration parameters of the user equipment transmitted from the HSS in the step 30 particularly as follows:

The MME receives an insert subscriber data message transmitted from the HSS, where the insert subscriber data message carries the MDT measurement configuration parameters of the user equipment accessing a network.

Preferably after the MME receives the MDT measurement configuration parameters of the user equipment transmitted from the HSS, the MME judges whether the cell list information in the MDT measurement configuration parameters includes information of a cell controlled by a target base station of a handover upon reception of a handover request transmitted from the base station serving the user equipment; and the MME transmits the MDT measurement configuration parameters to the target base station upon determining that the cell list information in the MDT measurement configuration parameters includes information of a cell controlled by the target base station of the handover.

In order to address the problem that a UE can not perform MDT measurement when the UE is configured by the network side to perform MDT measurement, embodiments of the invention provide another method of transmitting MDT measurement configuration parameters, and in this method, an MME transmits MDT measurement configuration parameters to a base station serving a user equipment upon reception of a handover request transmitted from the base station serving the user equipment if cell list information in the MDT measurement configuration parameters includes information of a cell controlled by a target base station of a handover.

Figure 4:
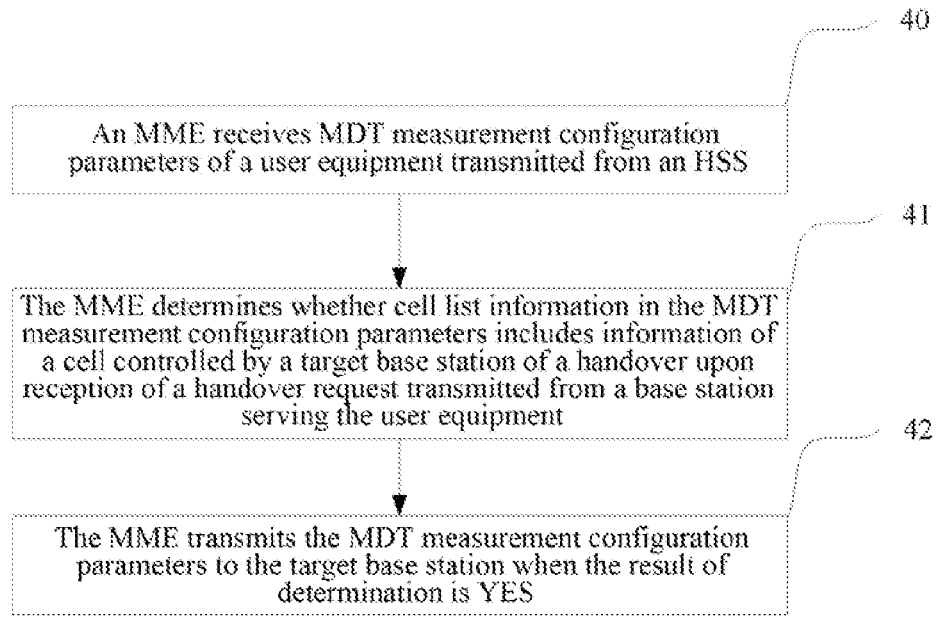
FIG. 4 is a schematic flow chart of another method according to an embodiment of the invention.

Referring to FIG. 4, a method of transmitting MDT measurement configuration parameters according to an embodiment of the invention includes the following steps:

Step 40: An MME receives MDT measurement configuration parameters of a user equipment transmitted from an HSS;

Step 41: The MME judges whether cell list information in the MDT measurement configuration parameters includes information of a cell controlled by a target base station of a handover upon reception of a handover request transmitted from a base station serving the user equipment; and Step 42: The MME transmits the MDT measurement configuration parameters to the target base station upon determining that the cell list information includes information of a cell controlled by the target base station of the handover.

In an embodiment, the MME receives the MDT measurement configuration parameters of the user equipment transmitted from the HSS in the step 40 particularly as follows:

The MME receives an insert subscriber data message transmitted from the HSS, where the insert subscriber data message carries the MDT measurement configuration parameters of the user equipment accessing a network.

In another embodiment, before the MME receives the MDT measurement configuration parameters of the user equipment transmitted from the HSS in the step 40, the MME receives an initial user equipment message transmitted from the base station serving the user equipment, where the initial user equipment message is a message transmitted from the base station after establishing an RRC connection with the user equipment in an idle status; and the MME transmits an update location request message to the HSS to request the HSS for updating the location of the user equipment in a network; and Correspondingly the MME receives the MDT measurement configuration parameters of the user equipment transmitted from the HSS in the step 40 particularly as follows:

The MME receives an update location answer message returned from the HSS, where the update location answer message carries the MDT measurement configuration parameters of the user equipment.

In order to address the problem that a UE can not perform MDT measurement when the UE is configured by the network side to perform MDT measurement, embodiments of the invention provide still another method of transmitting MDT measurement configuration parameters, and in this method, an MME obtains information of a serving cell of a user equipment accessing a network from a base station serving the user equipment, and transmits MDT measurement configuration parameters to the base station serving the user equipment if cell list information in the MDT measurement configuration parameters includes the information of the serving cell.

Figure 5:
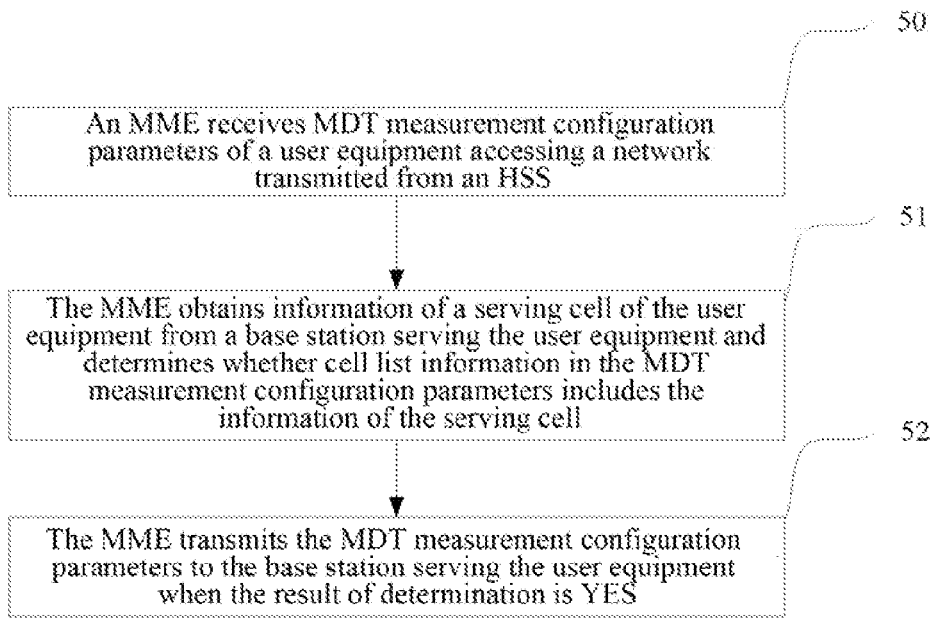
FIG. 5 is a schematic flow chart of still another method according to an embodiment of the invention.

Referring to FIG. 5, a method of transmitting MDT measurement configuration parameters according to an embodiment of the invention includes the following steps:

Step 50: An MME receives MDT measurement configuration parameters of a user equipment accessing a network transmitted from an HSS;

Step 51: The MME obtains information of a serving cell of the user equipment from a base station serving the user equipment and judges whether cell list information in the MDT measurement configuration parameters includes the information of the serving cell; and Step 52: The MME transmits the MDT measurement configuration parameters to the base station serving the user equipment if the cell list information includes the information of the serving cell.

The MME can obtain the information of the serving cell of the user equipment from the base station serving the user equipment in the step 51 particularly as follows:

The MME transmits a location report control message to the base station serving the user equipment to request the base station for reporting the information of the serving cell of the user equipment; and the MME receives the information of the serving cell of the user equipment reported from the base station.

The MME can receive the MDT measurement configuration parameters of the user equipment accessing the network transmitted from the HSS in the step 50 particularly as follows:

The MME receives an insert subscriber data message transmitted from the HSS, where the insert subscriber data message carries the MDT measurement configuration parameters of the user equipment accessing the network.

Figure 6:
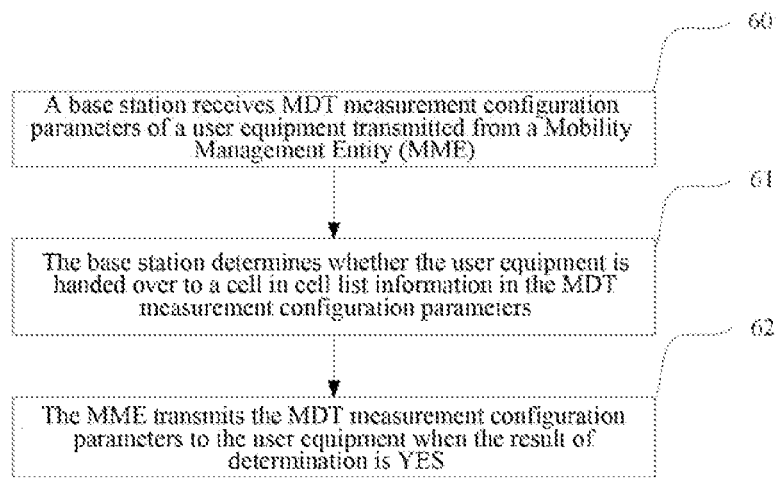
FIG. 6 is a schematic flow chart of a further method according to an embodiment of the invention.

For the base station side, an embodiment of the invention provides a method of transmitting MDT measurement configuration parameters, and referring to FIG. 6, the method includes the following steps:

Step 60: A base station receives MDT measurement configuration parameters of a user equipment transmitted from a Mobility Management Entity (MME);

Step 61: The base station judges whether the user equipment is handed over to a cell in cell list information in the MDT measurement configuration parameters; and Step 62: The base station transmits the MDT measurement configuration parameters to the user equipment upon determining that the user equipment is handed over to a cell in the cell list information in the MDT measurement configuration parameters.

The invention will be described below in connection with particular embodiments thereof.

Since an MME can obtain information of a serving cell of a UE only when the UE has an initial access, the MME is subsequently unaware of whether the serving cell of the UE has been changed in numerous cases (for example, when the UE is subjected to an intra-eNB handover), and consequently the MME can not determine when to transmit MDT measurement configuration parameters to a serving eNB of the UE. Thus the present application proposes the following methods to address this problem in a scenario where an area scope of MDT measurement configured by an Operation and Maintenance (OAM) device is determined by a cell list:

In a first solution, the MME judges whether to transmit the MDT measurement configuration parameters to the serving eNB of the UE according to the eNB, and the eNB judges whether to transmit the MDT measurement configuration parameters to the UE according to the serving cell of the UE, particularly in the following three cases:

In a first case, if the UE is still in an idle status when the OAM device initiates MDT measurement configuration, then thereafter when the UE establishes a connection, the MME judges whether the cell accessed by the UE is controlled by the same eNB as any cell in a cell list configured by the OAM device. If the serving cell of the UE is controlled by the same eNB as any cell in the cell list configured by the OAM device, then the MME has the MDT measurement configuration parameters carried in an initial UE context setup message transmitted to the eNB currently accessed by the UE. If the serving cell of the UE is not controlled by the same eNB as any cell in the cell list configured by the OAM device, then the MME does not have the MDT measurement configuration parameters carded in the initial UE context setup message.

In a second case, if the UE is still in a connected status when the OAM device initiates MDT measurement configuration, then the MDT measurement configuration parameters are not included in an initial UE context setup message transmitted to the eNB in an initial connection setup procedure of the UE. When the OAM device activates the MDT configuration, the MME firstly judges whether one or more cells in a cell list of the MDT measurement configuration parameters are a cell or cells controlled by the serving base station of the UE. If so, then the MME transmits the MDT measurement configuration parameters to the currently serving base station of the UE; or if not, then the MME will not transmit the MDT measurement configuration parameters to the base station.

In a third case, if the OAM device has configured the UE to perform MDT measurement, then in a handover process of the UE, if the MME determines that one or more cells in a cell list of the MDT measurement configuration parameters configured by the OAM device are controlled by a target base station of the UE, then the MME has the MDT measurement configuration parameters carried in a handover request message transmitted to the target base station; otherwise, the MME will not have the MDT measurement configuration parameters carried in the handover request message.

In a second solution, the MME transmits the MDT measurement configuration parameters by firstly obtaining the information of the serving cell in an S1 procedure and then judging whether to transmit the MDT measurement configuration parameters to the eNB according to the information.

First Embodiment

Figure 7A:
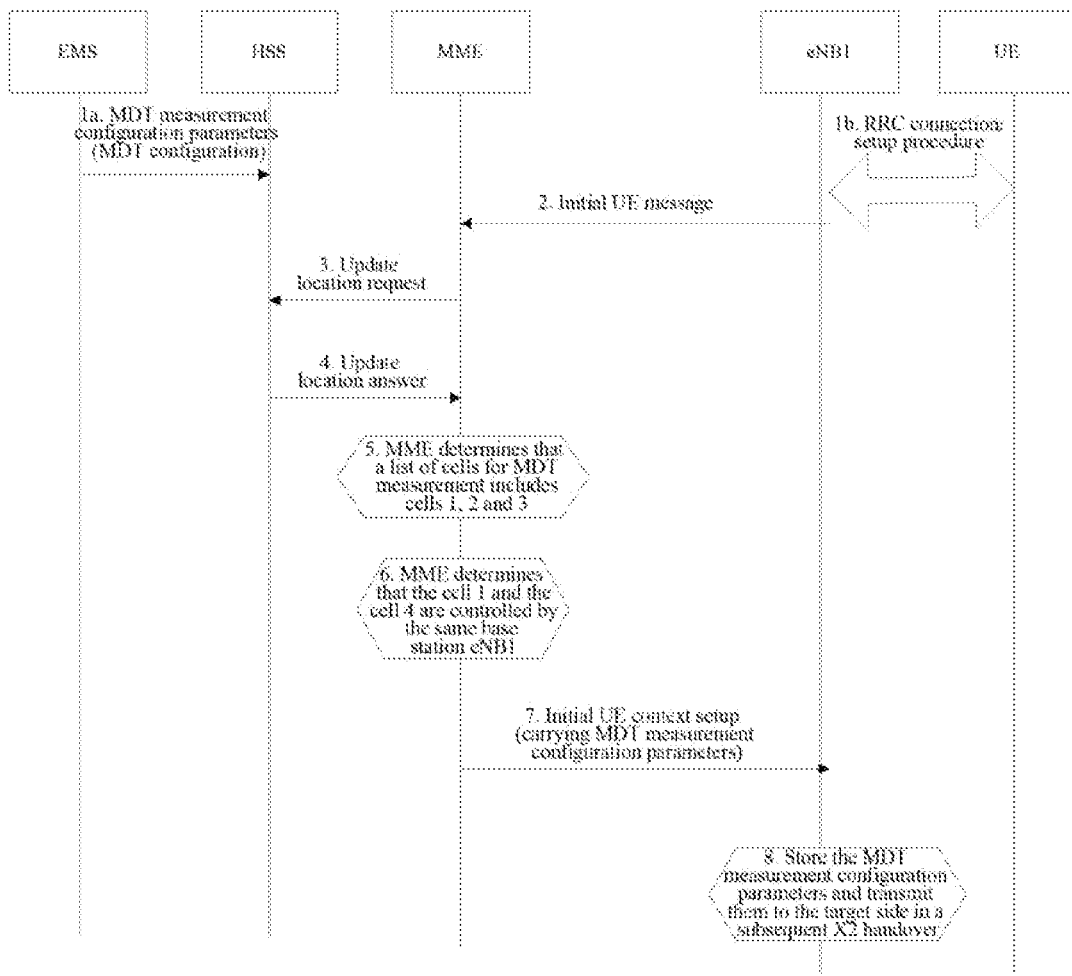
FIG. 7A is a schematic flow chart of a first embodiment of the invention.

As illustrated in FIG. 7A, the OAM device configures an IMSI to participate in MDT measurement in an area scope of measurement, that is, a $UE_A$ corresponding to the IMSI is required to perform MDT measurement in a cell1, a cell2 and a cell3. The $UE_A$ initiates an RRC connection setup request to a cell4 controlled by the same base station as the cell1.

Step 1a: A Element Management System (EMS) transmits MDT measurement configuration parameters to the HSS;

Step 1b: The $UE_A$ in an idle status initiates an RRC connection setup request to an eNB1;

Step 2: The eNB1 initiates an initial UE message to an MME after establishing an RRC connection with the $UE_A$;

Step 3: The MME transmits an Update Location Request message to the HSS to request the HSS for updating the location of the UE in a network;

Step 4: The HSS transmits an Update Location Answer message to the MME upon reception of the Update Location Request, where the message carries the MDT measurement configuration parameters;

Step 5: The MME determines the area scope of MDT measurement as the cell1, the cell2 and the cell3 according to the MDT measurement configuration parameters;

Step 6: The MME determines that an eNB currently serving the UE is the eNB1 and also the cell1 is controlled by the eNB1 according to the content in S1 signaling;

Step 7: The MME transmits an initial UE context setup message carrying the MDT measurement configuration parameters to the eNB1; and Step 8: The eNB1 stores the MDT measurement configuration parameters in the initial UE context setup message upon reception of the initial UE context setup message, so that the eNB can transmit the MDT measurement configuration parameters to the $UE_A$ in a connected status when the $UE_A$ moves to the cell1.

Second Embodiment

Figure 7B:
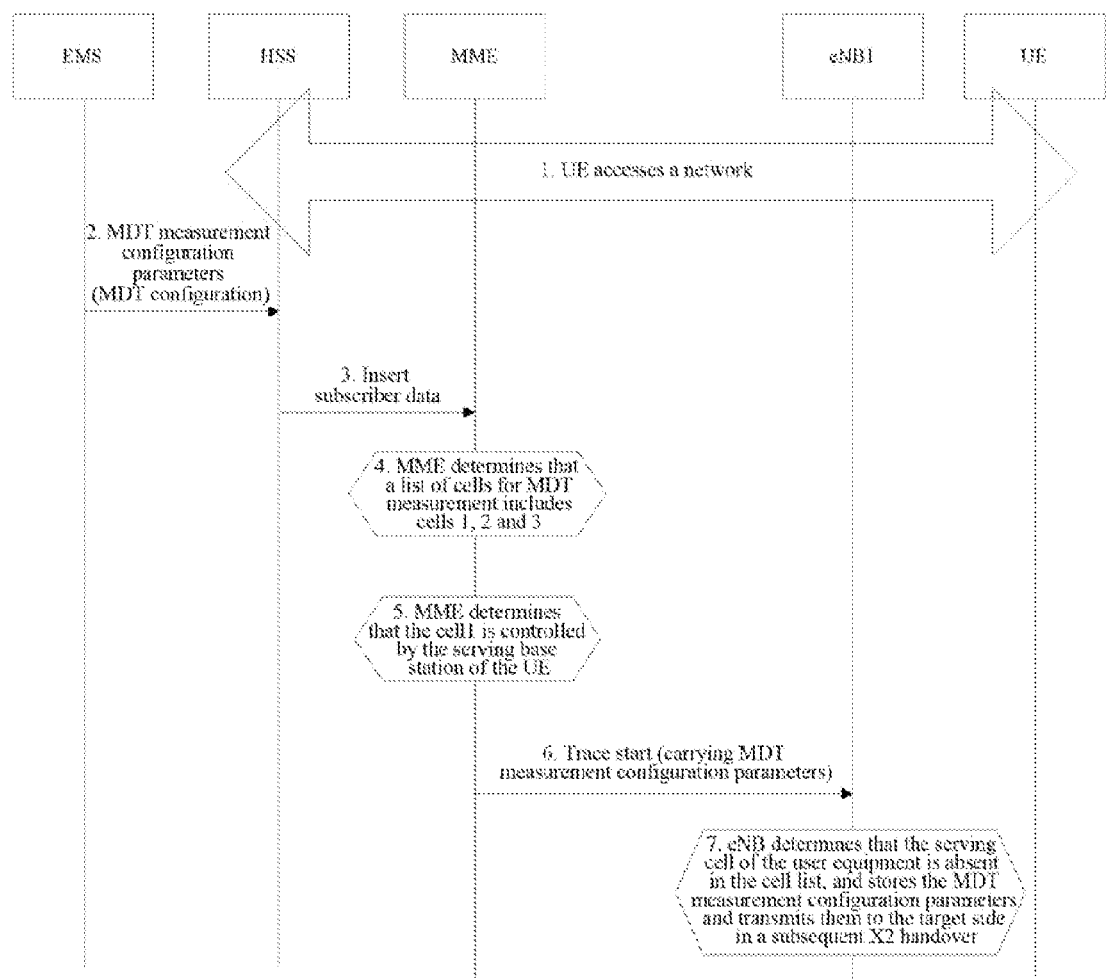
FIG. 7B is a schematic flow chart of a second embodiment of the invention.

As illustrated in FIG. 7B, a $UE_A$ has established a connection with a network. The OAM device configures an IMSI to participate in MDT measurement in an area scope of measurement, that is, a UE is required to perform MDT measurement in a cell1, a cell2 and a cell3 in a cell list. The IMSI corresponding to the $UE_A$.

Step 1: The $UE_A$ establishes a connection with the network through an eNB1, where a currently serving cell of the UE is a cell4;

Step 2: An EMS transmits a trace activation message to an HSS, where the message carries MDT measurement configuration parameters;

Step 3: The HSS transmits an insert subscriber data message carrying the MDT measurement configuration parameters to an MME upon reception of the trace activation message;

Step 4: The MME determines the area scope of measurement as the cell1, the cell2 and the cell3 according to the MDT measurement configuration parameters;

Step 5: The MME determines that the cell1 is controlled by the currently serving base station eNB1 of the $UE_A$;

Step 6: The MME transmits a trace start message carrying the MDT measurement configuration parameters to the eNB1.

Step 7: The eNB stores the MDT measurement configuration parameters in the trace start message upon reception of the trace start message, so that the eNB can transmit the MDT measurement configuration parameters to the $UE_A$ in a connected status when the $UE_A$ moves to the cell1.

Third Embodiment

Figure 7C:
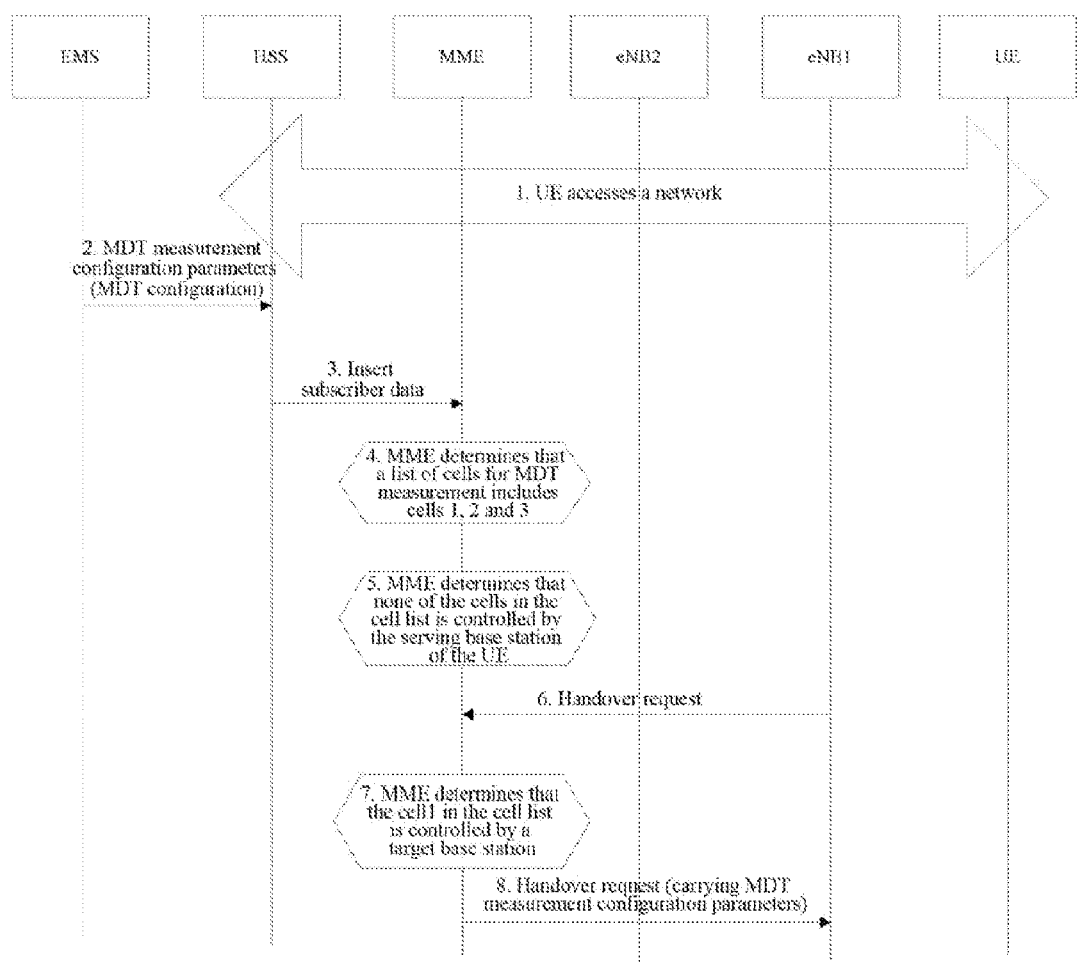
FIG. 7C is a schematic flow chart of a third embodiment of the invention.

As illustrated in FIG. 7C, the OAM device configures an IMSI to participate in MDT measurement in an area scope of measurement, that is, a $UE_A$ corresponding to the IMSI is required to perform MDT measurement in a cell1, a cell2 and a cell3. The $UE_A$ in a connected status initiates an S1 handover to a target cell which is a cell4 controlled by the same base station as the cell1.

Step 1: The UE establishes a connection with a network through an eNB1;

Step 2: An EMS transmits a trace activation message to an HSS, where the message carries MDT measurement configuration parameters;

Step 3: The HSS transmits an insert subscriber data message carrying the MDT measurement configuration parameters to an MME upon reception of the trace activation message;

Step 4: The MME determines the area scope of measurement as the cell1, the cell2 and the cell3 according to the MDT measurement configuration parameters;

Step 5: The MME determines that none of the MDT measurement cells is controlled by the currently serving base station eNB1 of the UE and will not transmit a trace start message to the eNB1;

Step 6: The $UE^A$ is subjected to an S1 handover to a target bases station eNB2, and the MME receives a handover request transmitted from the eNB1.

Step 7: The MME determines the cell1 among the MDT measurement cells is controlled by the target bases station eNB2.

Step 8: The MME transmits a handover request message carrying the MDT measurement configuration parameters to the eNB2.

Fourth Embodiment

Figure 7D:
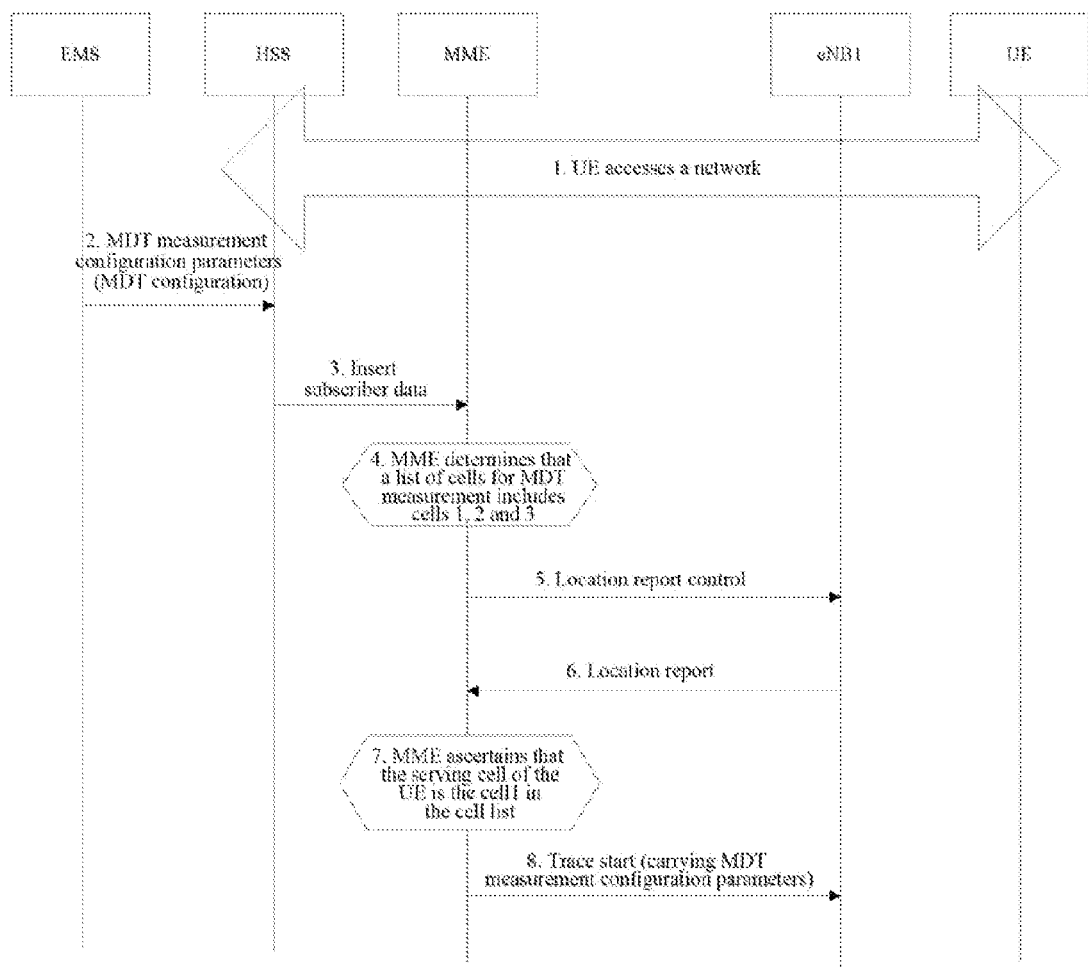
FIG. 7D is a schematic flow chart of a fourth embodiment of the invention.

As illustrated in FIG. 7D, a $UE_A$ has established a connection with a network, and a serving cell of the UE is a cell1. The OAM device configures an IMSI to participate in MDT measurement in an area scope of measurement including the cell1, a cell2 and a cell3, that is, a UE corresponding to the IMSI is required to perform MDT measurement in these specified cells.

Step 1: The $UE_A$ establishes a connection with the network through an eNB1, and the serving cell of the UE is the cell1.

Step 2: An EMS transmits a trace activation message to an HSS, where the message carries MDT measurement configuration parameters;

Step 3: The HSS transmits an insert subscriber data message carrying the MDT measurement configuration parameters to an MME upon reception of the trace activation message;

Step 4: The MME determines the area scope of measurement as the cell1, the cell2 and the cell3 according to the MDT measurement configuration parameters;

Step 5: The MME transmits a location report control message to the eNB1 to request for information of the serving cell of the $UE_A$;

Step 6: The eNB1 returns the serving cell of the UE, which is the cell1, in a location report message;

Step 7: The MME determines that the serving cell of the UE is in the cell list.

Step 8: The MME transmits the MDT measurement configuration parameters to the eNB1 in a trace start message. The eNB1 stores and transmits the MDT measurement configuration parameters to the $UE_A$ upon reception of the message.

Based upon the same inventive idea, embodiments of the invention further provide an MME and a wireless communication system, and since these apparatuses address the problem under a similar principle to the method of transmitting MDT measurement configuration parameters, reference can be made to the implementation of the method for implementations of these apparatuses, and a repeated description thereof will be omitted here.

Figure 8:
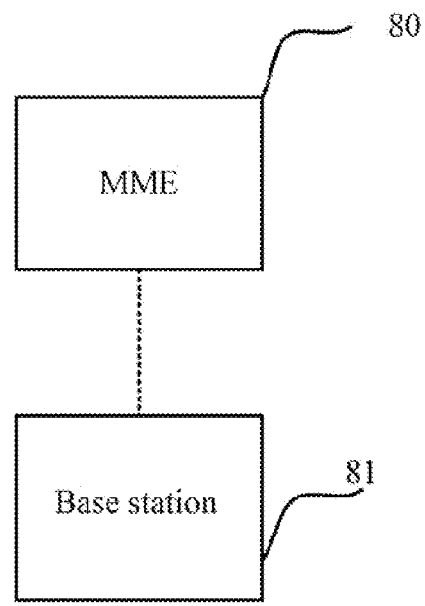
FIG. 8 is a schematic structural diagram of a system according to an embodiment of the invention.

Referring to FIG. 8, an embodiment of the invention further provides a wireless communication system including:

An MME 80 configured to receive MDT measurement configuration parameters of a user equipment transmitted from an MSS, to determine whether cell list information in the MDT measurement configuration parameters includes information of a cell controlled by a base station controlling a serving cell of the user equipment, and to transmit the MDT measurement configuration parameters to the base station serving the user equipment when the result of determination is YES; and The base station 81 configured to receive the MDT measurement configuration parameters of the user equipment transmitted from the MME, to determine whether the user equipment is handed over to a cell in the cell list information in the MDT measurement configuration parameters, and to transmit the MDT measurement configuration parameters to the user equipment when the result of determination is YES.

Still referring to FIG. 8 an embodiment of the invention further provides a wireless communication system including:

An MME 80 configured to receive MDT measurement configuration parameters of a user equipment transmitted from a Home Subscriber Server (HSS); to determine whether cell list information in the MDT measurement configuration parameters includes information of a cell controlled by a target base station of a handover upon reception of a handover request transmitted from a base station serving the user equipment; and to transmit the MDT measurement configuration parameters to the target base station when the result of determination is YES; and The base station 81 configured to receive the MDT measurement configuration parameters of the user equipment transmitted from the MME, to determine whether the user equipment is handed over to a cell in the cell list information in the MDT measurement configuration parameters, and to transmit the MDT measurement configuration parameters to the user equipment when the result of determination is YES.

Still referring to FIG. 8, an embodiment of the invention further provides a wireless communication system including:

An MME 80 configured to receive MDT measurement configuration parameters of a user equipment accessing a network transmitted from an HSS, to obtain information of a serving cell of the user equipment from a base station serving the user equipment, to determine whether cell list information in the MDT measurement configuration parameters includes the information of the serving cell, and to transmit the MDT measurement configuration parameters to the base station serving the user equipment when the result of determination is YES; and The base station 81 configured to receive the MDT measurement configuration parameters of the user equipment transmitted from the MME, and to transmit the MDT measurement configuration parameters to the user equipment.

Figure 9:
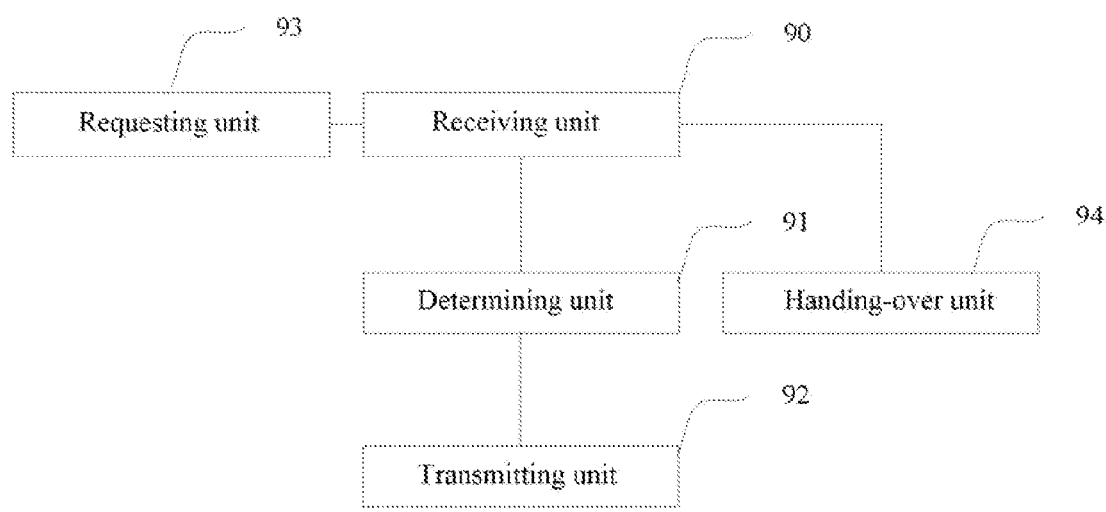
FIG. 9 is a schematic structural diagram of an apparatus according to an embodiment of the invention.

Referring to FIG. 9, an embodiment of the invention further provides an MME including:

A receiving unit 90 configured to receive MDT measurement configuration parameters of a user equipment transmitted from an HSS;

A determining unit 91 configured to determine whether cell list information in the MDT measurement configuration parameters includes information of a cell controlled by a base station controlling a serving cell of the user equipment; and A transmitting unit 92 configured to transmit the MDT measurement configuration parameters to the base station serving the user equipment when the result of determination is YES.

The apparatus further includes:

A requesting unit 93 configured, before the MDT measurement configuration parameters of the user equipment transmitted from the HSS is received, to receive an initial user equipment message transmitted from the base station serving the user equipment, where the initial user equipment message is a message transmitted from the base station after establishing a Radio Resource Control (RRC) connection with the user equipment in an idle status, and to transmit an update location request message to the HSS to request the HSS for updating the location of the user equipment in a network; and The receiving unit 90 is configured:

To receive an update location answer message returned from the HSS, where the update location answer message carries the MDT measurement configuration parameters of the user equipment.

The receiving unit 90 is configured:

To receive an insert subscriber data message transmitted from the HSS, where the insert subscriber data message carries the MDT measurement configuration parameters of the user equipment accessing a network.

The apparatus further includes:

A handing-over unit 94 configured, after the MDT measurement configuration parameters of the user equipment transmitted from the HSS is received, to receive a handover request transmitted from the base station serving the user equipment, to determine whether the cell list information in the MDT measurement configuration parameters includes information of a cell controlled by a target base station of a handover; and to transmit the MDT measurement configuration parameters to the target base station when the result of determination is YES.

Figure 10:
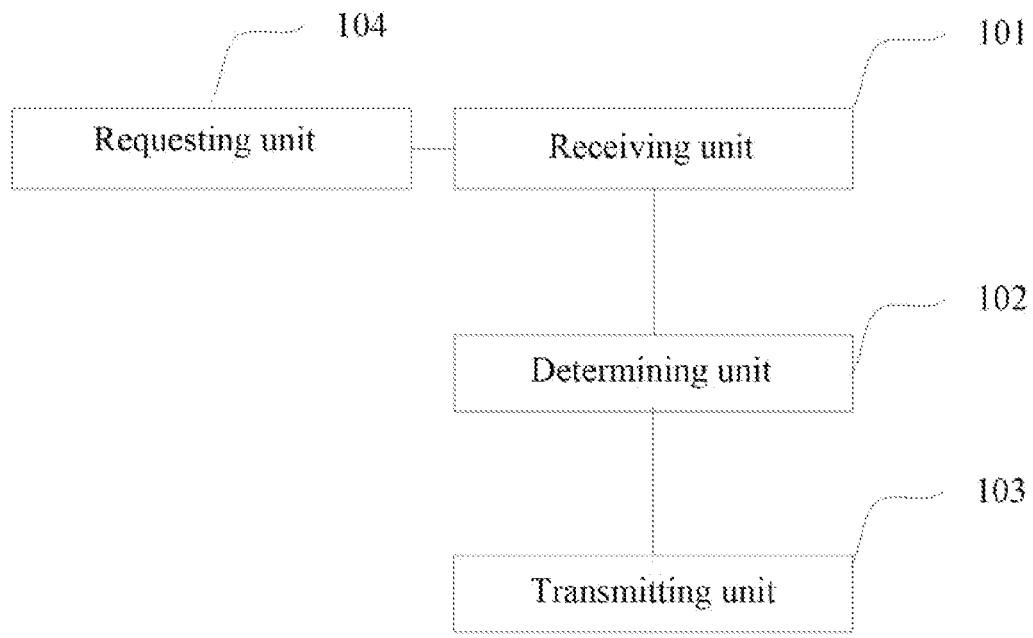
FIG. 10 is a schematic structural diagram of another apparatus according to an embodiment of the invention.

Referring to FIG. 10, an embodiment of the invention further provides an MME including:

A receiving unit 101 configured to receive MDT measurement configuration parameters of a user equipment transmitted from an HSS;

A determining unit 102 configured to determine whether cell list information in the MDT measurement configuration parameters includes information of a cell controlled by a target base station of a handover upon reception of a handover request transmitted from a base station serving the user equipment;

A transmitting unit 103 configured to transmit the MDT measurement configuration parameters to the target base station when the result of determination is YES; and The receiving unit 101 is configured:

To receive an insert subscriber data message transmitted from the HSS, where the insert subscriber data message carries the MDT measurement configuration parameters of the user equipment accessing a network.

The apparatus further includes:

A requesting unit 104 configured, before the MDT measurement configuration parameters of the user equipment transmitted from the HSS is received, to receive an initial user equipment message transmitted from the base station serving the user equipment, where the initial user equipment message is a message transmitted from the base station after establishing a Radio Resource Control (RRC) connection with the user equipment in an idle status, and to transmit an update location request message to the HSS to request the HSS for updating the location of the user equipment in the network; and The receiving unit 101 is configured:

To receive an update location answer message returned from the HSS, where the update location answer message carries the MDT measurement configuration parameters of the user equipment.

Figure 11:
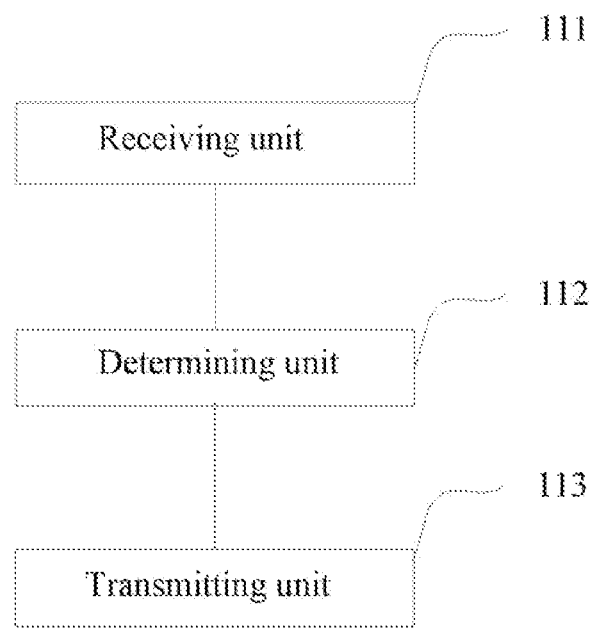
FIG. 11 is a schematic structural diagram of still another apparatus according to an embodiment of the invention.

Referring to FIG. 11, an embodiment of the invention further provides an MME including:

A receiving unit 111 configured to receive MDT measurement configuration parameters of a user equipment accessing a network transmitted from a Home Subscriber Server (HSS);

A determining unit 112 configured to obtain information of a serving cell of the user equipment from a base station serving the user equipment, and to determine whether cell list information in the MDT measurement configuration parameters includes the information of the serving cell; and A transmitting unit 113 is configured to transmit the MDT measurement configuration parameters to the base station serving the user equipment 1, when the result of determination is YES.

The determining unit 112 is configured:

To transmit a location report control message to the base station serving the user equipment to request the base station for reporting the information of the serving cell of the user equipment; and To receive the information of the serving cell of the user equipment reported from the base station.

The receiving unit 111 is configured:

To receive an insert subscriber data message transmitted from the HSS, where the insert subscriber data message carries the MDT measurement configuration parameters of the user equipment accessing the network.

Still referring to FIG. 11, an embodiment of the invention further provides a base station including:

A receiving unit 111 configured to receive MDT measurement configuration parameters of a user equipment transmitted from an MME;

A determining unit 112 configured to determine whether the user equipment is handed over to a cell in cell list information in the MDT measurement configuration parameters; and A transmitting unit 113 configured to transmit the MDT measurement configuration parameters to the user equipment when the result of determination is YES.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of transmitting Minimization of Drive-Tests (MDT) measurement configuration parameters, the method comprising:

a Mobility Management Entity (MME) receiving MDT measurement configuration parameters of a user equipment transmitted from a Home Subscriber Server (HSS); and the MME transmitting the MDT measurement configuration parameters to a base station serving the user equipment upon determining that cell list information in the MDT measurement configuration parameters includes information of a cell controlled by the base station controlling a serving cell of the user equipment;

wherein the serving cell is absent in the cell list; and the cell controlled by the base station controlling the serving cell of the user equipment is one cell, to which the user equipment subsequently hands over and needs to perform the MDT measurement, other than the serving cell of the user equipment, controlled by the base station.

2. The method according to claim 1, wherein before the MME receives the MDT measurement configuration parameters of the user equipment transmitted from the HSS, the method further comprises:

the MME receiving an initial user equipment message transmitted from the base station serving the user equipment, wherein the initial user equipment message is a message transmitted from the base station after establishing a Radio Resource Control (RRC) connection with the user equipment in an idle status; and the MME transmitting an update location request message to the HSS to request the HSS for updating the location of the user equipment in a network; and the MME receiving the MDT measurement configuration parameters of the user equipment transmitted from the HSS comprises:

the MME receiving an update location answer message returned from the HSS, wherein the update location answer message carries the MDT measurement configuration parameters of the user equipment.

3. The method according to claim 1, wherein the MME receiving the MDT measurement configuration parameters of the user equipment transmitted from the HSS comprises:

the MME receiving an insert subscriber data message transmitted from the HSS, wherein the insert subscriber data message carries the MDT measurement configuration parameters of the user equipment accessing a network.

4. A Mobility Management Entity (MME), the MME comprising a processor and a memory coupled to the processor, wherein the memory is configured to store instructions and the processor is configured to execute the instructions to:

receive MDT measurement configuration parameters of a user equipment transmitted from a Home Subscriber Server (HSS);

determine whether cell list information in the MDT measurement configuration parameters includes information of a cell controlled by a base station controlling a serving cell of the user equipment; and transmit the MDT measurement configuration parameters to the base station serving the user equipment when determining that the cell list information in the MDT measurement configuration parameters includes information of the cell controlled by the base station controlling the serving cell of the user equipment;

wherein the serving cell is absent in the cell list; and the cell controlled by the base station controlling the serving cell of the user equipment is one cell, to which the user equipment subsequently hands over and needs to perform the MDT measurement, other than the serving cell of the user equipment, controlled by the base station.

5. The MME according to claim 4, wherein the processor is further configured:

to receive an initial user equipment message transmitted from the base station serving the user equipment before the MDT measurement configuration parameters of the user equipment transmitted from the HSS is received, wherein the initial user equipment message is a message transmitted from the base station after establishing a Radio Resource Control (RRC) connection with the user equipment in an idle status; and to transmit an update location request message to the HSS to request the HSS for updating the location of the user equipment in a network; and to receive the MDT measurement configuration parameters of the user equipment transmitted from the HSS comprises:

to receive an update location answer message returned from the HSS, wherein the update location answer message carries the MDT measurement configuration parameters of the user equipment.

6. The MME according to claim 4, wherein the processor is further configured:

to receive an insert subscriber data message transmitted from the HSS, wherein the insert subscriber data message carries the MDT measurement configuration parameters of the user equipment accessing a network.

* * * * *